Patented Jan. 2, 1923.

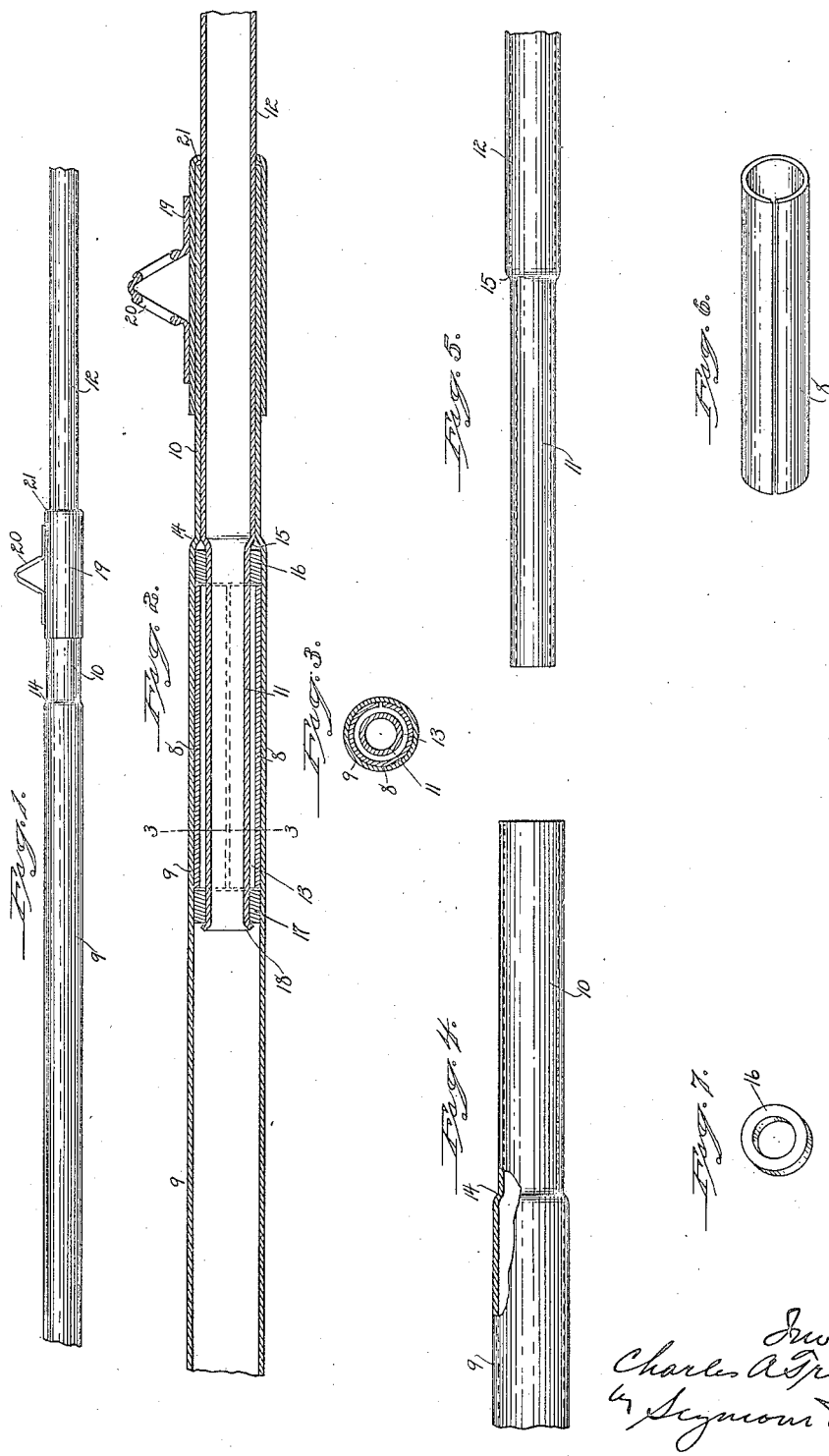

1,441,045

UNITED STATES PATENT OFFICE.

CHARLES A. TREDWELL, OF NEW HAVEN, CONNECTICUT, ASSIGNOR TO WINCHESTER REPEATING ARMS CO., OF NEW HAVEN, CONNECTICUT, A CORPORATION.

TELESCOPIC FISHING ROD.

Application filed June 13, 1922. Serial No. 567,914.

*To all whom it may concern:*

Be it known that I, CHARLES A. TREDWELL, a citizen of the United States, residing at New Haven, in the county of New Haven and State of Connecticut, have invented a new and useful Improvement in Telescopic Fishing Rods; and I do hereby declare the following, when taken in connection with the accompanying drawings and the characters of reference marked thereon, to be a full, clear, and exact description of the same, and which said drawings constitute part of this application and represent in—

Fig. a broken view, in side elevation, of a telescopic fishing-rod, embodying my invention.

Fig. 2 an enlarged broken view thereof in longitudinal central section.

Fig. 3 a view thereof, in transverse section, on the line 3—3 of Fig. 2.

Fig. 4 a detached broken view, partly in section, of the upper end of the first or butt-section of the rod.

Fig. 5 a detached broken view of the lower end of the second section of the rod.

Fig. 6 a detached perspective view of the expansible friction-tube of the joint.

Fig. 7 a detached perspective view of one of the retaining-rings of the joint.

My invention relates to an improved, sheet-metal, telescopic fishing-rod, the object being to provide simple, durable and efficient means for maintaining the several units or sections of the rod in relative longitudinal adjustment, whether that be extended or telescoped.

With these ends in view, my invention consists in a telescopic fishing-rod having certain details of construction and combinations of parts as will be hereinafter pointed out in the claim.

In carrying out my invention, as herein shown, I employ a longitudinally-split, expansible friction-tube 8, the external diameter of which is slightly larger, normally, or when the tube is unconfined and fully expanded, than the internal diameter of the body 9 of the first or butt-section unit of the rod, the upper end of which section is reduced to form a sleeve 10. When, however, the said tube is compressed and confined within the said body 9, its internal diameter is considerably larger than the external diameter of the sleeve 11 formed by reducing the lower end of the second rod-section or unit, the body 12 of which is smaller in diameter than the body 9 of the first or butt-section or unit thereof, so that, when the sleeve 10 is sleeved over the body 12 and the sleeve 11 correspondingly entered into the body 9, an annular clearance space 13 will be formed between the exterior surface of the sleeve 11 and the interior surface of the expansible tube 8. Between the body 9 and sleeve 10 of the butt-section, a stop-shoulder 14 is formed, while between the body 12 and sleeve 11 of the second rod-section, a retaining-shoulder 15 is formed, the said shoulders being produced by reducing the said sections to produce the sleeves thereof. I also employ two corresponding collars 16 and 17, adapted in internal diameter to fit snugly over the sleeve 11 and in external diameter to fit snugly within the body 9.

In assembling the several parts, above described, the sleeve 11 is inserted into the body 9, at which time the sleeve 10 is sleeved over the body 12. The collar 16 is now introduced through the open lower end of the body 9 and passed over the sleeve 11, finally coming to rest upon the retaining-shoulder 15. The tube 8, having first been compressed to reduce its diameter, is then crowded into the body 9, until its upper edge is brought to a bearing upon the collar 16, previously inserted as described. The tube 8 now expands and makes friction contact with the inner wall of the body 9, but entirely clears the sleeve 11, than which it is larger in diameter, even when compressed. The other collar 17 is now inserted through the open lower end of the body 9 and passed over the projecting end of the sleeve 11 and brought to a bearing upon the adjacent edge of the tube 8. The slightly projecting end of the sleeve 11 is then swaged, as at 18, whereby the several parts are held together. The effort of the tube 8 to expand against the inner surface of the body 9 creates sufficient friction to control the extending or telescoping of the two rod-sections or units thus coupled together, while, at the same time, the two collars 16 and 17 maintain the axial integrity of the two units of the rod, all of the units of which are similarly differentiated in diameter, constructed and coupled. When the rod is extended, the collar 16 engages with the shoulder 15 and prevents the separation of the two units.

As shown, the outer surface of the sleeve 10 is provided with a mounting-band 19 carrying a line-guide 20, and has its extreme upper end turned inward, as at 21, to form a pleasing finish.

I claim:

In a telescopic fishing-rod, the combination with two rod-sections or units differentiated in diameter and having their adjacent ends reduced to form sleeves and shoulders, of an expansible friction-tube split throughout its length and larger in external diameter, when unconfined and fully expanded, than the internal diameter of the larger unit into which it is introduced and with the inner face of which its outer face has frictional contact, and two collars applied to the respective ends of the sleeve of the smaller unit and having the said friction-tube interposed between and in contact with them, the extreme ends of the sleeve last mentioned being expanded to hold the several parts together and to prevent the complete separation of the said two rod-sections.

In testimony whereof, I have signed this specification in the presence of two subscribing witnesses.

CHARLES A. TREDWELL.

Witnesses:
 ERIK S. PALMER,
 WALTER M. THOMPSON.